United States Patent [19]

Duley

[11] 4,400,661
[45] Aug. 23, 1983

[54] VOLTAGE REGULATION AND BATTERY DISSIPATION LIMITER CIRCUIT

[75] Inventor: Raymond S. Duley, Spring Valley, Ohio

[73] Assignee: NCR Corporation, Dayton, Ohio

[21] Appl. No.: 308,313

[22] Filed: Oct. 2, 1981

[51] Int. Cl.$^3$ .............................................. G05F 1/44
[52] U.S. Cl. ..................................... 323/275; 307/66; 323/303
[58] Field of Search ................. 307/64, 66; 320/9, 13, 320/29, 43; 323/275, 276, 280, 303

[56] References Cited

U.S. PATENT DOCUMENTS

| | | | |
|---|---|---|---|
| 3,573,483 | 4/1971 | White | 307/66 |
| 3,721,887 | 3/1973 | Nickerson | 320/13 |
| 3,740,569 | 6/1973 | Carcia | 323/276 X |
| 3,792,341 | 2/1974 | Kime, Jr. | 323/285 |
| 4,146,829 | 3/1979 | Rinaldi | 320/13 |
| 4,210,855 | 7/1980 | Harer et al. | 320/13 |
| 4,225,792 | 9/1980 | Fahey | 307/66 |
| 4,272,816 | 6/1981 | Matsumoto | 364/483 |

Primary Examiner—William M. Shoop
Attorney, Agent, or Firm—J. T. Cavender; Albert L. Sessler, Jr.; Elmer Wargo

[57] ABSTRACT

A regulator circuit which provides voltage regulation for a normal power supply and a battery used in a battery back-up system. A first portion of the circuit detects when the battery is about to go into a deep discharge condition (when operated in the battery back-up mode) and a second portion of the circuit is used to regulate the output voltage to a load. When the first portion of the circuit detects the deep discharge condition, it disconnects the load and the second portion of the circuit from the battery. The first portion of the circuit draws a very small current.

7 Claims, 3 Drawing Figures

VOLTAGE REGULATION AND BATTERY DISSIPATION LIMITER CIRCUIT

BACKGROUND OF THE INVENTION

This invention relates to a circuit which provides voltage regulation to a utilization circuit while the normal supply of power thereto is available and which also limits the dissipation of a battery in a battery back-up circuit when the normal supply of power is disrupted, and the utilization circuit is thereafter operated from the battery.

Certain computer systems, for example, utilize dynamic random access memories (RAMs) which must be periodically refreshed in order to retain the data stored therein. Usually, these systems provide a battery, back-up circuit to refresh the RAMs in the event of a power failure. Generally, these back-up circuits are designed to provide power to refresh the RAMs for a time period of about 72 hours, which period covers a usual weekend in which a power failure may occur while the system may be left unattended. In some countries, it is necessary to disconnect the computer systems from the usual power receptacles as a safety measure when the systems are left unattended over a weekend, and in these situations, the battery back-up circuits are periodically used.

The batteries which are typically used in these battery back-up circuits are of the re-chargeable type. These batteries can be recharged after normal use providing that they are not drained beyond what is termed a "deep discharge" level. If they are drained beyond the deep discharge level, it is difficult to conveniently recharge them, and consequently, it may be necessary to replace them at considerable expense.

SUMMARY OF THE INVENTION

The circuit of this invention comprises an input terminal; a positive rail connected to the input terminal; an output terminal for connection to a load; a negative rail; means for supplying an unregulated positive potential to said input terminal; means for receiving a battery having its positive terminal connected to said input terminal and its negative terminal connected to said negative rail; a first circuit portion comprising: a first means coupled between said positive and negative rails for establishing a reference potential therebetween; and means for determining when the potential of said battery decreases to a critical level with regard to the reference potential and also for producing a first output when the potential at said input terminal falls to said critical level and for producing a second output while the potential at said input terminal is above said critical level. It also includes a second circuit portion coupled between said positive rail and said output terminal for regulating the output potential at said output terminal, comprising: means for determining the potential at said output terminal; and means for comparing the potential at said output terminal with said reference potential and for regulating said potential at said output terminal in accordance therewith. The first circuit portion also includes means for respectively enabling and disabling said second circuit portion in response to said first and second outputs.

A feature of this invention is that when the voltage level in the battery included in the battery back-up circuit reaches a critical level, the load is disconnected from the battery, leaving only a small trickle current to flow through a portion of the circuit of this invention, thereby minimizing the drain on the battery.

Another feature of the circuit of this invention is that regulation of the output potential to the load connected thereto is effected very close to the potential level at which the load is disconnected from the battery, i.e. at the critical voltage level of the battery.

These features and others, including an economy of construction, will become more apparent from the following description and drawing.

DETAILED DESCRIPTION OF THIS INVENTION

Figure 1:
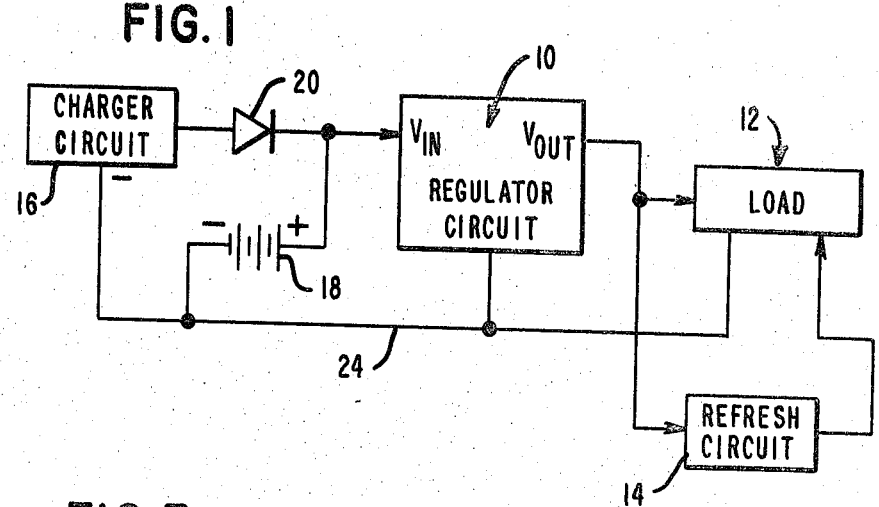
FIG. 1 is a general schematic diagram showing a typical environment in which the circuit of this invention may be used.

FIG. 1 is a general schematic diagram showing a typical environment in which the voltage regulation and battery dissipation limiter circuit of this invention designated generally as 10 may be used. The voltage regulation and battery dissipation limiter circuit 10, hereinafter called regulator circuit 10, has a regulated output $V_{out}$ which is fed into a utilization device or load 12. As stated earlier herein, the load 12 may be dynamic RAMs which need to be refreshed, and in this situation, a conventional refresh circuit 14 is used. In the particular embodiment described, the load 12 consists of eight 64K dynamic RAMs although, naturally, the principles of this invention may be extended to different memory sizes or types, or they may be extended to other utilization devices such as some varieties of visual displays which need to be "refreshed." The refresh circuit 14 is conventionally coupled to $V_{out}$ of the regulator circuit 10 and the load 12 to refresh the dynamic RAMs therein in a conventional manner. Because this aspect may be conventional, it need not be described in any further detail.

The input voltage $V_{in}$ to the regulator circuit 10 (FIG. 1) comes from a charger circuit 16 during normal operations, and also comes from a battery 18 when the charger circuit 16 is inoperative. The charger circuit 16 may be any type of permanent power supply; for example, it may be connected to a source of A.C. power and may contain the usual rectifiers and filters (not shown) to provide the necessary voltage level or levels to the particular load 12 being fed thereby. A unidirectional device shown as a diode 20 is utilized to prevent the current from the battery 18 from circulating through the charger circuit 16 when the charger circuit 16 is inoperative or inactive for any reason, thereby preventing unnecessary power loss from the battery 18. Under normal conditions, the charger circuit 16 charges the battery 18 as is done, customarily. The battery 18 utilized in the embodiment described is a re-chargeable battery such as a Gates, rechargeable, sealed, lead-acid battery providing 6 volts at 2.5 amp hours.

In the environment depicted in FIG. 1, if the charger circuit 16 fails to provide the necessary power to the load 12, the battery 18 will be called upon to do so. As stated earlier herein, the battery 18 will provide power to the RAMs in the load 12 to periodically refresh the row addresses therein via the refresh circuit 14 for a period of about 72 hours. During the time that the battery 18 is supplying power to the regulator circuit 10, the regulator circuit 10 also provides a regulated output voltage $V_{out}$. If the voltage of battery 18 drops to its critical level at any time during the 72 hours, in the example being discussed, or beyond that period, the regulator circuit 10 will disconnect the battery 18 from the load 12. In the example described, the critical voltage of battery 18 ($V_{CR}$) is about 5.0 volts and the deep discharge level ($V_{DD}$) is about 4.9 volts. After the battery 18 is so disconnected, only a small current will be drawn by only a portion of the regulator circuit 10. The rationale for this action is that if the battery 18 were to be discharged beyond its deep discharge level, the battery 18 would be damaged and might have to be replaced, and the data in the RAMs in the load 12 would be lost. Therefore, because the data will be lost when the battery 18 goes into a deep discharge state, it is better to save the battery 18. After the load like 12 is disconnected from the battery 18 (due to $V_{in}$ reaching the critical level $V_{CR}$ of 5.0 volts), the battery 18 can supply power to that portion 26 of circuit 10 which is still active for a period of about 60 days before the voltage of the battery 18 drops to its deep discharge level of 4.9 volts in the example described.

Figure 2:
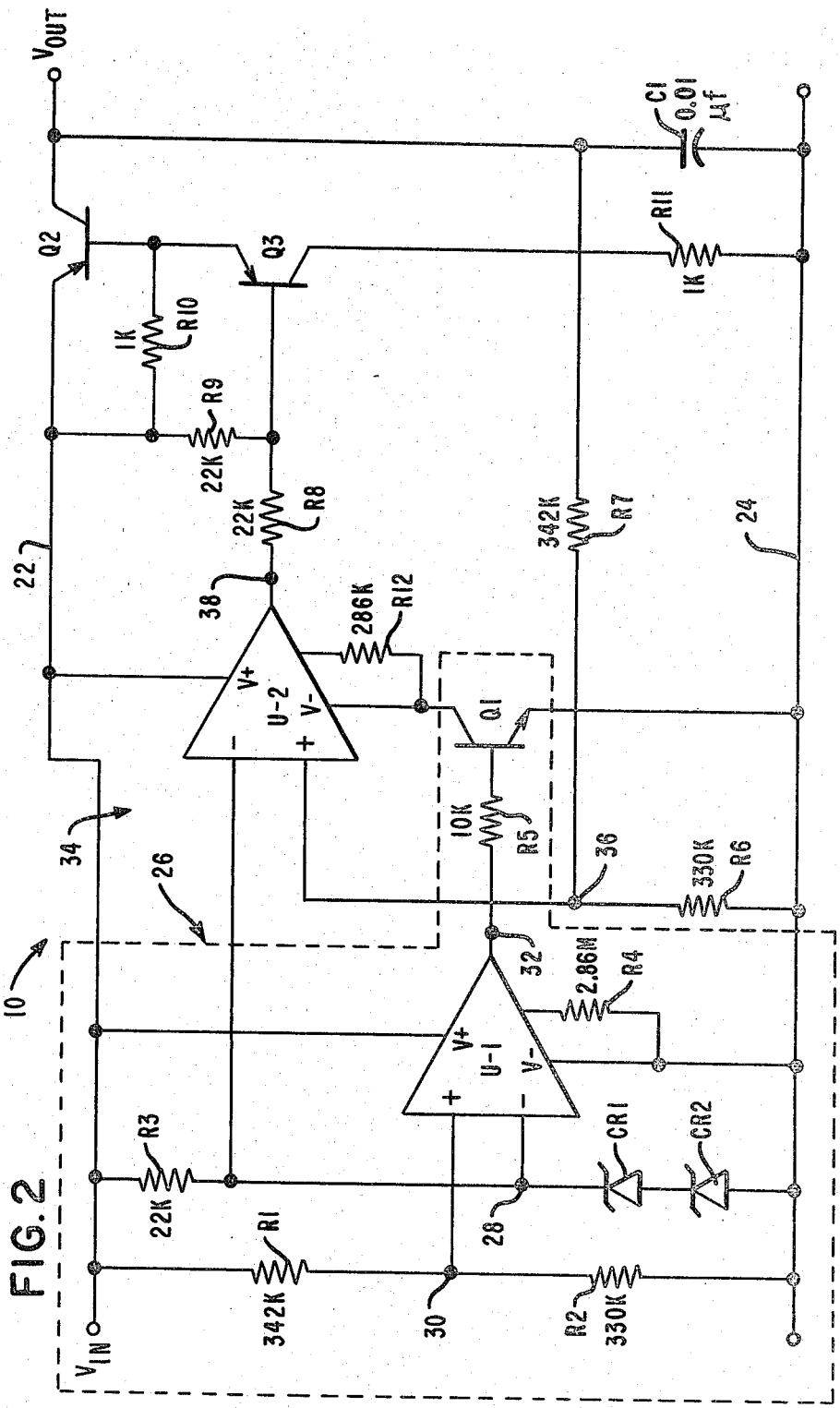
FIG. 2 is a detailed schematic showing the circuit of this invention.

The regulator circuit 10 is shown in more detail in FIG. 2, and it includes a positive rail 22 and a negative rail 24. The output of the charger circuit 16 and the positive terminal of the battery are connected to the input terminal or end ($V_{in}$) of the positive rail 22 to supply an unregulated voltage thereto, and the negative terminal of the charger circuit 16 and negative terminal of the battery 18 are connected to the negative rail 24.

The regulator circuit 10 (FIG. 2) includes a first circuit portion which is included within the dashed outline 26 which functions basically as a battery protection device to prevent the battery 18 from going into a deep discharge state when it is called upon to supply power to the load 12 in a battery back-up mode.

The first circuit portion 26 (FIG. 2) includes a means for providing a reference potential level at node 28; this means includes circuit elements CR1 and CR2 which are series connected, forming a combination having one end thereof connected to the negative rail 24 and the remaining end thereof connected to the node 28. A resistor R3, having one end connected to the positive rail 22 and its remaining end connected to the node 28, completes the remaining portion of the means for providing the reference potential at node 28.

While the circuit elements CR1 and CR2 are shown in FIG. 2 as Zener diodes, they are actually printed circuits, of type LM385 which are manufactured by National Semiconductor, for example. The function of the circuit elements CR1 and CR2 is to provide a reference voltage. The particular circuit elements mentioned each provide a reference voltage of 1.23 volts at 500 microamps, which is a very small operating current. Circuit elements CR1 and CR2 are available in models which operate at 100 microamps of current; however, these models are very expensive compared to the types mentioned above. It would be cheaper to utilize a circuit element for elements CR1 and CR2 other than the type LM385 printed circuits mentioned; however, cheaper varieties used for elements CR1 and CR2 would use more operating current (typically, 5 to 10 milliamps) which would tend to defeat the intent of putting a minimum drain on the battery 18 for the first circuit portion 26. The use of the circuit elements CR1 and CR2 (FIG. 2) provides a reference potential of approximately 2.46 volts at node 28. A measure of the input potential $V_{in}$ is provided at node 30 located at the junction of series connected resistors R1 and R2 whose remaining ends are connected, respectively, to the positive rail 22 and the negative rail 24. Resistor R3 supplies bias current through the circuit elements CR1 and CR2 which circuit elements then maintain the reference voltage at node 28. The resistors R1 and R2 are selected to act as a voltage divider network so that node 30 will be equal to about 2.46 volts (the reference potential) when the potential at $V_{in}$ is approximately equal to the critical voltage of 5.0 volts.

The calculation for the values of resistors R1 and R2 is as follows:

1. As previously stated the reference potential $V_{REF}$=voltage of CR1 plus the voltage of CR2=1.23+1.23=2.46 V.

2. The potential at node 30=$V_{30}$, and $$V_{30}=V_{in}[R2/(R+R2)]. \qquad \text{EQ. 1}$$

Assuming a deep discharge voltage ($V_{DD}$) of battery 18 equal to approximately 4.9 volts, this means that the battery should be protected when the potential at $V_{in}$ decreases to less than approximately 5.0 volts, the critical voltage. Assuming a resistor value for R2 equal to approximately 330K and substituting the various values in EQ. 1 above, while using a voltage at node 30 equal to the reference potential of 2.46 volts at node 28, R1 can be solved as follows:

$$5.0 \text{ V}[330K/(R1+330K)]=2.46 \text{ volts},$$

and $$R1=342K.$$

The reference potential at node 28 (FIG. 2) is fed into the (−) input of a multi-purpose programmable operational amplifier U-1 (which will be referred to hereinafter as op amp U-1), and the potential at node 30 (which provides a measure of $V_{in}$ for the purpose of detecting $V_{CR}$) is fed into the (+) input of the op amp U-1. When the potential at $V_{in}$ drops below 5 volts or $V_{CR}$, the potential at node 30 drops below the reference potential of 2.46 volts at node 28; the op amp U-1 senses this difference causing the output of op amp U-1 at node 32 to switch from a high voltage level to a low voltage level or a logic zero level. When the potential at $V_{in}$ rises above 5.0 volts, the op amp U-1 senses the difference between nodes 30 and 28, causing the output thereof to switch to a high voltage level, resulting in transistor Q1 being turned on. A resistor R5 connects node 32 with the base of the NPN transistor Q1. A logic zero level at node 32 causes transistor Q1 to turn off.

Transistor Q1 (FIG. 2) has its emitter connected to the negative rail 24 and its collector connected to the (V−) input or grounding terminal of a second op amp U-2 which is identical to op amp U-1 already described. The power input (V+) of op amp of U2 is connected to the positive rail 22. Transistor Q1 functions as a switch to turn off or turn on a second portion of the regulator circuit 10 which is all of that portion 34 which is outside the first circuit portion 26. When the output of op amp U-1 at node 32 is at a logic zero level due to the potential at $V_{in}$ falling below the $V_{CR}$ level, transistor Q1 switches off or it "de-activates" op amp U-2 and the circuit portion 34, and when the output of the op amp U-1 at node 32 is at a high voltage level, transistor Q1 switches on or it "activates" op amp U-2 and the circuit portion 34 to start regulating the output potential $V_{out}$.

When the circuit portion 34 (FIG. 2) is out of the circuit 10 or de-activated, indicating that the potential at $V_{in}$ has fallen below 5.0 volts, there are only 3 paths through which current is allowed to flow; they are: the series path through resistors R1 and R2, the series path through resistor R3 and circuit elements CR1 and CR2, and the path through op amp U-1. Because these paths are designed to normally take a very small current (as, for example, less than about 250 microamps), they do not produce an excessive drain on the battery 18 (which may have a rating of 2.5 amp hours) after the $V_{CR}$ level of the battery 18 is approached.

The circuit portion 34 (FIG. 2) of circuit 10 provides the regulation of $V_{out}$ when the input potential $V_{in}$ is above 5.0 volts in the embodiment described, as previously stated. The potential at $V_{out}$ is sensed via a node 36 located at the junction of series-connected resistors R6 and R7 which form a voltage divider network. One end of resistor R6 is connected to the negative rail 24, and the remaining end of resistor R7 is connected to the output of circuit 10 or $V_{out}$. Resistors R6 and R7 provide a feed-back element from $V_{out}$ of the circuit 10. Node 36 is connected to the (+) input of the op amp U-2, and the (−) input of op amp U-2 is connected to the reference potential at node 28 as previously described.

The regulating technique employed by the second portion 34 of the circuit 10 (FIG. 2) is as follows. During a start-up condition after the conduction of transistor Q1 turns on the op amp U-2, the output of op amp Q-2 goes to a low voltage level stage of approximately zero volts which in turn drives transistors Q3 and Q2 to the fully-on condition. The op amp U-2 senses the increase at node 36 by comparing it with the reference potential at node 28, causing the output thereof at node 38 to become more positive than it was prior to the increase in $V_{out}$. A more positive output at node 38 drives the PNP transistor Q3 in a less conductive direction, and this in turn also drives the PNP transistor Q2 in a less conductive direction, tending to lower or regulate the output potential $V_{out}$ to about 5.0 volts. When the output potential $V_{out}$ drops slightly below 5 volts, due to an increase in the current requirements of the load 12, for example, the potential at node 36 will be slightly less than the reference potential of 2.46 volts at node 28. The op amp U-2 senses this condition, causing its output at node 38 to become less positive than it was prior to the decrease in potential at $V_{out}$. The slightly less positive output at node 38 increases the base drive to transistor Q3, causing increased current flow from the emitter to collector of transistor Q3; this in turn increases the base current of transistor Q2 which allows more current to flow to the load (like 12), increasing the potential at $V_{out}$.

The values of the various components selected for the illustrative embodiment shown in FIG. 2 are shown thereon, and some additional comments related to them seem appropriate. Capacitor C1 is used to assist in regulating the output $V_{out}$ of circuit 10 and in stabilizing the circuit 10 to keep it from oscillating. Resistor R8 which is connected between node 38 and the base of transistor Q3 limits the base current into transistor Q3. Transistor Q3 drives or amplifies the output signal from op amp U-2 at node 38 to drive the base of transistor Q2 as previously stated. Transistor Q2 is referred to as a pass transistor; its emitter is connected to the positive rail 22 or $V_{in}$ and its collector is connected to $V_{out}$. Resistor R11, which is connected between the negative rail 24 and the emitter of transistor Q3, is used to limit the current seen by transistors Q2 and Q3. When transistor Q2 is turned on fully (by the output of op amp U-2 becoming least positive of its outputs) resistor R11 is the current limiting resistor which limits the base current of transistor Q2 and the emitter to collector current of transistor Q3. Resistor R11 limits the flow of current through transistors Q3 and Q2 to protect them against excessive current flow. As the potential at the emitter of transistor Q3 approaches 5 volts, transistors Q3 and Q2 will tend to be shut off as there will be little forward biasing of the emitter to base junctions of these transistors. When the circuit portion 34 of circuit 10 is regulating the output $V_{out}$, transistors Q2 and Q3 are operated in the active region of their transistor characteristic curves.

Another way of viewing the operation of transistors Q2 and Q3 is to view them with regard to current flow. Assume for the moment that the unregulated voltage on the emitter of transistor Q2 is about 3 volts more positive than the regulated output $V_{out}$ on the collector thereof. When this situation exists, very little current to the base of transistor Q2 is needed via transistor Q3. As the potential between the emitter and collector of transistor Q2 decreases to about 2 volts in the example being described and to less than that, the feedback from node 36 causes the base currents of transistors Q3 and Q2 to increase (to maintain the potential at $V_{out}$) as previously described, tending to drive the transistor Q2 towards deep saturation. As the voltage $V_{in}$ on the positive rail 22 approaches about 5.0 volts, or the critical voltage with regard to the battery 18, the op amp U-1 will switch to a logic zero level (turning off transistor Q1) causing the (V−) input of op amp U-2 to be disconnected from the negative rail 24. Transistors Q3 and Q2 then will be turned off, and the resistors R9 and R10 function as pull-up resistors to keep the base and emitter of each of the transistors Q3 and Q2 at nearly the same potential or at cut off; this de-activates circuit portion 34.

The resistors R4 and R12 determine the amount of gain at which the op amps U-1 and U-2, respectively, operate. In the embodiment described, resistor R4 is 10 times larger than resistor R12; this means that resistor R4 will limit or "program" the op amp U-1 so that it draws very little current. Resistor R12 is selected or programmed so as to get the appropriate power gain out of op amp U-2. In a charging cycle when the potential level ($V_{in}$) rises above the $V_{CR}$ level of the battery 18, the output of op amp U-1 at node 32 goes to a positive state or level, allowing current flow through resistor R5 turning on transistor Q1 as previously explained. When transistor Q1 conducts, it also switches in the programming resistor R12 while turning on op amp U-2. Op amp U-1 is programmed to handle signal currents and op amp U-2 is programmed to handle voltage regulating currents or the power gain necessary for driving transistors Q3 and Q2.

Figure 3:
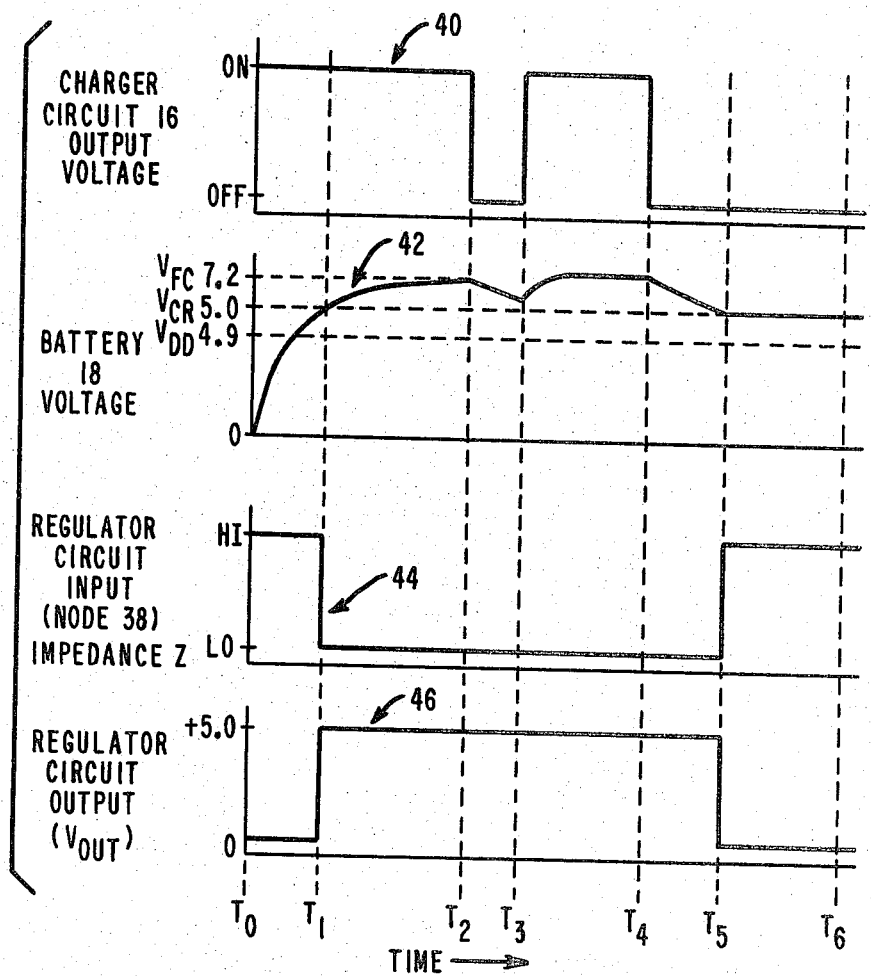
FIG. 3 is a collection of waveforms showing certain operating characteristics of the circuit of this invention.

FIG. 3 shows various waveforms 40, 42, 44, and 46 associated with regulator circuit 10, charger circuit 16, and the battery 18. Various times $T_0$, $T_1$, $T_2$, $T_3$, $T_4$, $T_5$ and $T_6$ are shown across the base of FIG. 3; however, these times are not necessarily shown in proper scale.

Waveform 40 (FIG. 3) simply shows when the charger circuit is in the "off" and "on" states.

Waveform 42 (FIG. 3) shows the voltage levels of battery 18. In the embodiment described, the voltage level of the battery 18 in a fully-charged condition ($V_{FC}$) is about 7.2 volts; the critical level ($V_{CR}$) thereof is about 5.0 volts; and the deep discharge level ($V_{DD}$) thereof is 4.9 volts.

Waveform 44 (FIG. 3) shows the input impedance of the regulator circuit 10 at node 38 in FIG. 2.

Waveform 46 (FIG. 3) shows the output ($V_{out}$) of the regulator circuit 10; in the embodiment described, the output $V_{out}$ is 5.0 volts.

When the charger circuit is on (waveform 40 in FIG. 3), the battery 18 is charged as shown by waveform 42. When the battery voltage level reaches about 5.0 volts at time $T_1$, the input impedance or voltage level at node 38 (waveform 44) changes from a high level to a low level starting the regulation of $V_{out}$ as shown by waveform 46.

The charger circuit 16 is "on" generally all the time; however, if for any reason the charger circuit 16 fails, its output will fall as seen by waveform 40 at time $T_2$ in FIG. 3. Between times $T_2$ and $T_3$ (which may be a period of about 72 hours) the battery 18 provides the power, and consequently, during this time it begins to discharge as seen by waveform 42. As seen from waveform 46 between times $T_1$ and $T_3$, for example, the output $V_{out}$ is regulated while the charger circuit 16 is "on" or while the battery 18 alone supplies the power. At time $T_3$, the charger circuit 16 comes back on, and the battery voltage has not reached the $V_{CR}$ level. Normal charging of the battery occurs between times $T_3$ and $T_4$ as seen from waveform 42; a relatively fast recharging of battery 18 is effected because it was not discharged below its $V_{DD}$. At time $T_4$, the charger circuit 16 fails, and the battery 18 is called upon again to supply power to the load 12 and 14. At time $T_5$, which is more than 72 hours later than time $T_4$, the battery 18 is drained to its $V_{CR}$ level. The $V_{CR}$ level on waveform 42 is shown as 5.0 volts. At time $T_4$, the output $V_{out}$ of regulator circuit 10 is turned off and, in this example, data is lost from the RAMs in the load 12 in the embodiment described. After time $T_5$ only a small trickle current (as shown by waveform 42) is drawn from the battery 18 to supply current to the first portion 26 of the regulator circuit 10 as previously described. The period between $T_5$ and $T_6$, in the example described, may be in excess of 60 days before the $V_{DD}$ of battery 18 is reached.

I claim:
1. A circuit comprising:
an input terminal;
an output terminal for connection to a load;
a positive rail connected to said input terminal;
a negative rail;
means for supplying an unregulated positive potential to said input terminal;
means for receiving a battery having its positive terminal connected to said input terminal and its negative terminal connected to said negative rail;
a first circuit portion comprising:
a first means coupled between said positive and negative rails for establishing a reference potential therebetween; and
means for determining when the potential of said battery decreases to a critical level with regard to the reference potential and also for producing a first output when the potential at said input terminal falls to said critical level and for producing a second output while the potential at said input terminal is above said critical level;
a second circuit portion coupled between said positive rail and said output terminal for regulating the output potential at said output terminal comprising:
means for determining the potential at said output terminal; and
means for comparing the potential at said output terminal with said reference potential and for regulating said potential at said output terminal in accordance therewith; and
said first circuit potential also including control means for respectively enabling and disabling said second circuit portion in response to said first and second outputs so that only a small trickle current passes through said first circuit portion and no current passes through said second circuit portion in response to said second output from said control means.

2. The circuit as claimed in claim 1 in which said determining means of said first circuit portion comprises means for sensing the potential at said input terminal, and an operational amplifier having first and second control inputs thereto coupled respectively to said reference potential and said sensing means; said operational amplifier producing said first and second outputs.

3. The circuit as claimed in claim 2 in which said comparing means of said second circuit portion comprises an second operational amplifier having first and second control inputs thereto coupled respectively to said reference potential in said first circuit portion and to said determining means in said second circuit portion for regulating said potential at said output terminal.

4. The circuit as claimed in claim 3 in which each of said operational amplifiers of said first and second circuit portions is programmable and has respectively first and second programmable members operatively coupled thereto so as to place predetermined operating characteristics of said operational amplifiers in a predetermined relationship to each other.

5. A circuit comprising:
an input terminal;
an output terminal for connection to a load;
a positive rail connected to said input terminal;
a negative rail;
means for supplying an unregulated positive potential to said input terminal;
means for receiving a battery having its positive terminal connected to said input terminal and its negative terminal connected to said negative rail;
a first circuit portion comprising:
a first means coupled between said positive and negative rails for establishing a reference potential therebetween; and
means for determining when the potential of said battery decreases to a critical level with regard to the reference potential and also for producing a first output when the potential at said input terminal falls to said critical level and for producing a second output while the potential at said input terminal is above said critical level;
a second circuit portion coupled between said positive rail and said output terminal for regulating the output potential at said output terminal comprising:
means for determining the potential at said output terminal; and means for comparing the potential at said output terminal with said reference potential and for regulating said potential at said output terminal in accordance therewith; and said first circuit portion also including control means for respectively enabling and disabling said second circuit portion in response to said first and second outputs;

said determining means of said first circuit portion comprising means for sensing the potential at said input terminal, and an operational amplifier having first and second control inputs thereto coupled respectively to said reference potential and said sensing means; said operational amplifier producing said first and second outputs;

said comparing means of said second circuit portion comprising a second operational amplifier having first and second control inputs thereto coupled respectively to said reference potential in said first circuit portion and to said determining means in said second circuit portion for regulating said potential at said output terminal;

each of said operational amplifiers of said first and second circuit portions being programmable and having respectively first and second programmable members operatively coupled thereto so as to place predetermined operating characteristics of said operational amplifiers in a predetermined relationship to each other;

said control means comprising an electronic switch, and said second operational amplifier having positive and negative terminals for supplying operating power thereto, said positive terminal being connected to said positive rail, and said second programmable member and said last named negative terminal being coupled through said electronic switch to said negative rail so that the operating power to said second operational amplifier is turned off in response to said second output from said control means.

6. The circuit as claimed in claim 5 in which said first and second programmable members are resistors having a resistance ratio of ten to one, and in which said electronic switch is an NPN transistor.

7. The circuit as claimed in claim 6 in which said second circuit portion also includes a PNP pass transistor having its emitter connected to said positive rail and its collector connected to said output terminal, and also includes a control transistor coupled between the output of said second operational amplifier and the base of said PNP pass transistor.

* * * * *